US010705829B2

(12) United States Patent
Grabska et al.

(10) Patent No.: US 10,705,829 B2
(45) Date of Patent: Jul. 7, 2020

(54) SOFTWARE DISCOVERY USING EXCLUSION (71) Applicant: International Business Machines Corporation, Armonk, NY (US)

(72) Inventors: Monika Grabska, Cracow (PL); Piotr Kania, Cracow (PL); Slawomir T. Mezyk, Marcinkowice (PL); Michal S. Paluch, Cracow (PL); Grzegorz Poniewozik, Rzeszow (PL); Tomasz L. Prudzic, Ul. Radzikowskiego (PL); Pawel Slowikowski, Cracow (PL); Patryk M. Walawender, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/084,584

(22) Filed: Mar. 30, 2016

(65) Prior Publication Data
US 2017/0286095 A1 Oct. 5, 2017

(51) Int. Cl.
G06F 9/455 (2018.01)
G06F 8/70 (2018.01)
G06F 8/61 (2018.01)

(52) U.S. Cl.
CPC . *G06F 8/70* (2013.01); *G06F 8/61* (2013.01)

(58) Field of Classification Search
CPC .......................................................... G06F 8/70
See application file for complete search history.

(56) References Cited

U.S. PATENT DOCUMENTS

| 5,960,170 A * | 9/1999 | Chen ...................... G06F 21/564 714/26 |
| 6,968,461 B1 * | 11/2005 | Lucas ................... G06F 21/564 713/187 |
| 7,665,123 B1 * | 2/2010 | Szor ....................... G06F 21/554 713/188 |
| 8,539,445 B2 | 9/2013 | Gangemi et al. |
| 8,881,131 B2 | 11/2014 | Capomassi et al. |
| 9,176,974 B1 * | 11/2015 | Burr ....................... G06F 16/148 |
| 2005/0114658 A1 * | 5/2005 | Dye ........................ G06F 21/55 713/165 |
| 2005/0228963 A1 * | 10/2005 | Rothman ............... G06F 3/0613 711/170 |
| 2006/0143713 A1 * | 6/2006 | Challener ............. G06F 21/565 726/24 |
| 2007/0240222 A1 * | 10/2007 | Tuvell ..................... G06F 21/56 726/24 |
| 2009/0248636 A1 * | 10/2009 | Gangemi .................. G06F 8/60 |

(Continued)

OTHER PUBLICATIONS

Halderman(Web article: MediaMax Permanently Installs and Runs Unwanted Software, Even If User Declines EULA, dated Nov. 28, 2005, retrieved on Dec. 13, 2017, URL: https://freedom-to-tinker.com/2005/11/28/mediamax-permanently-installs-and-runs-unwanted-software-even-if-user-declines-eula/).*

(Continued)

*Primary Examiner* — Hang Pan
(74) *Attorney, Agent, or Firm* — Stephen R. Yoder (57) ABSTRACT

One or more processors determine that one or more memory locations in a client computing device contain one or more software artifacts that provide a match to a first software signature. One or more processors send instructions not to scan the one or more memory locations against a second software signature.

15 Claims, 5 Drawing Sheets

(56) References Cited

U.S. PATENT DOCUMENTS

| | | | |
|---|---|---|---|
| 2014/0108469 A1* | 4/2014 | Majka | G06F 17/3007 |
| | | | 707/821 |
| 2015/0007316 A1* | 1/2015 | Ben-Shalom | H04L 63/1416 |
| | | | 726/23 |
| 2015/0007328 A1* | 1/2015 | Zou | G06F 21/552 |
| | | | 726/24 |
| 2015/0089473 A1 | 3/2015 | Gocek et al. | |
| 2015/0143359 A1 | 5/2015 | Boudreau et al. | |
| 2015/0222647 A1* | 8/2015 | Lietz | H04L 63/1416 |
| | | | 726/23 |

OTHER PUBLICATIONS

"Modifying the configuration file for software signature inventory scanning", Printed on Dec. 23, 2015 1:50 PM, 1 page, <http://www-01.ibm.com/support/knowledgecenter/SS2GNX_5.1.1/com.ibm.tivoli.tpm.chg.doc/discovery/tdsc_citconfig.html>.

\* cited by examiner

SOFTWARE DISCOVERY USING EXCLUSION

BACKGROUND OF THE INVENTION

The present invention relates generally to the field of software asset management, and more particularly to software discovery.

Computer software is fundamentally a set of instructions written to carry out a desired task. Computer software can be stored and distributed in many forms, including but not limited to local storage such as hard disk drives and optical media (e.g. compact discs), networked storage devices, and even non-digital media (e.g. punch cards). The highly portable nature of computer software, and other digital content, facilitates duplication and distribution. Computer software can be made up of many individual software components, such as files or executable programs, which are typically encapsulated in an executable installation package for ease of distribution.

SUMMARY

Embodiments of the present invention provide a method, system, and program product to utilize exclusion during software discovery. One or more processors determine that one or more memory locations in a client computing device contain one or more software artifacts that provide a match to a first software signature. One or more processors send instructions not to scan the one or more memory locations against a second software signature.

DETAILED DESCRIPTION

Software deployment is the process of making computer software available for use on a computer system. Conventional software deployment involves copying an installation package to the local storage of a computer system and executing the installation package to place the individual software components on the system. In a network environment, where computer software must be deployed to multiple computer systems, this process is typically automated. Furthermore, in network environments, the installation package is typically executed remotely on a networked storage device and only the individual software components from within the installation package are copied to the multiple computer systems.

The use and distribution of commercially available computer software is typically controlled by software licenses. Depending on the level of software license purchased, the computer software may be fully activated or some features may be limited. Different software license options are typically available for the level of features desired and the number of computer systems that may use the software package under a single software license.

Software asset management (SAM) typically refers to the tracking and management of computer software installed on a computer system for the purposes of keeping the computer software up to date, identifying conflicts, managing software licenses, and tracking software usage. Software asset management solutions are typically employed in large organizations where numerous packages of computer software are deployed to a multitude of computer systems in a networked environment.

SAM often requires periodic scans of client computing devices in order to discover the identity and version of software currently installed on the client computers. Software discovery signature catalogs contain software discovery signatures that are typically provided by software vendors in order to facilitate the periodic scanning of client computing devices for current software. Software discovery signatures define the steps required in order to detect a specific version, edition, and release level of a particular software application. Typically, the software discovery catalog resides on a SAM server and provides the software discovery signatures to a scanning agent residing on a client computing device. The scanning agent uses the software discovery signature to scan the client computing device for artifacts that indicate the presence or absence of a particular version, edition, and release level of software.

Some solutions provide software discovery via software discovery signatures. In some such solutions, a catalog provides basic and advanced software discovery signatures. The basic software discovery signatures are used to detect particular entries in system native registries (e.g., operating systems that add/remove programs, packaged software registries, etc.). The advanced software discovery signatures are used to discover specific files on client computing device file systems and check if a file path meets a given criteria (e.g., a file is under a particular directory). The advanced software discovery signatures also allow a scanning agent to determine if a file has certain meta attributes that meet other criteria (e.g., file version).

In general, software discovery signatures discover software based on either a single source of data (e.g., file systems, registries, installed packages, etc.) or multiple sources of data in various configurations. Typically, each software discovery signature is assigned to a specific software release. If the specific software release is discovered by the client computing device scanning agent, then a "true" value is returned. Otherwise, a "false" value is returned if the specific software release is not present on the client computing device.

Embodiments of the present invention recognize that software discovery using software signatures requires extensive scanning of memory and storage locations that do not necessarily contain the targeted software and may not contain any software artifacts/identifiers at all. Embodiments of the present invention recognize that software discovery scanning of memory and storage locations that do not contain software artifacts/identifiers uses computer resources and may reduce computing performance. Embodiments of the present invention provide a method, computer program product, and computer system to allow certain memory and storage locations to be excluded from software signature discovery scans when the target software will not be found in those locations. Such an exclusion of select memory and storage locations can reduce consumption of computer resources and improve overall computing performance.

The present invention will now be described in detail with reference to the Figures.

Figure 1:
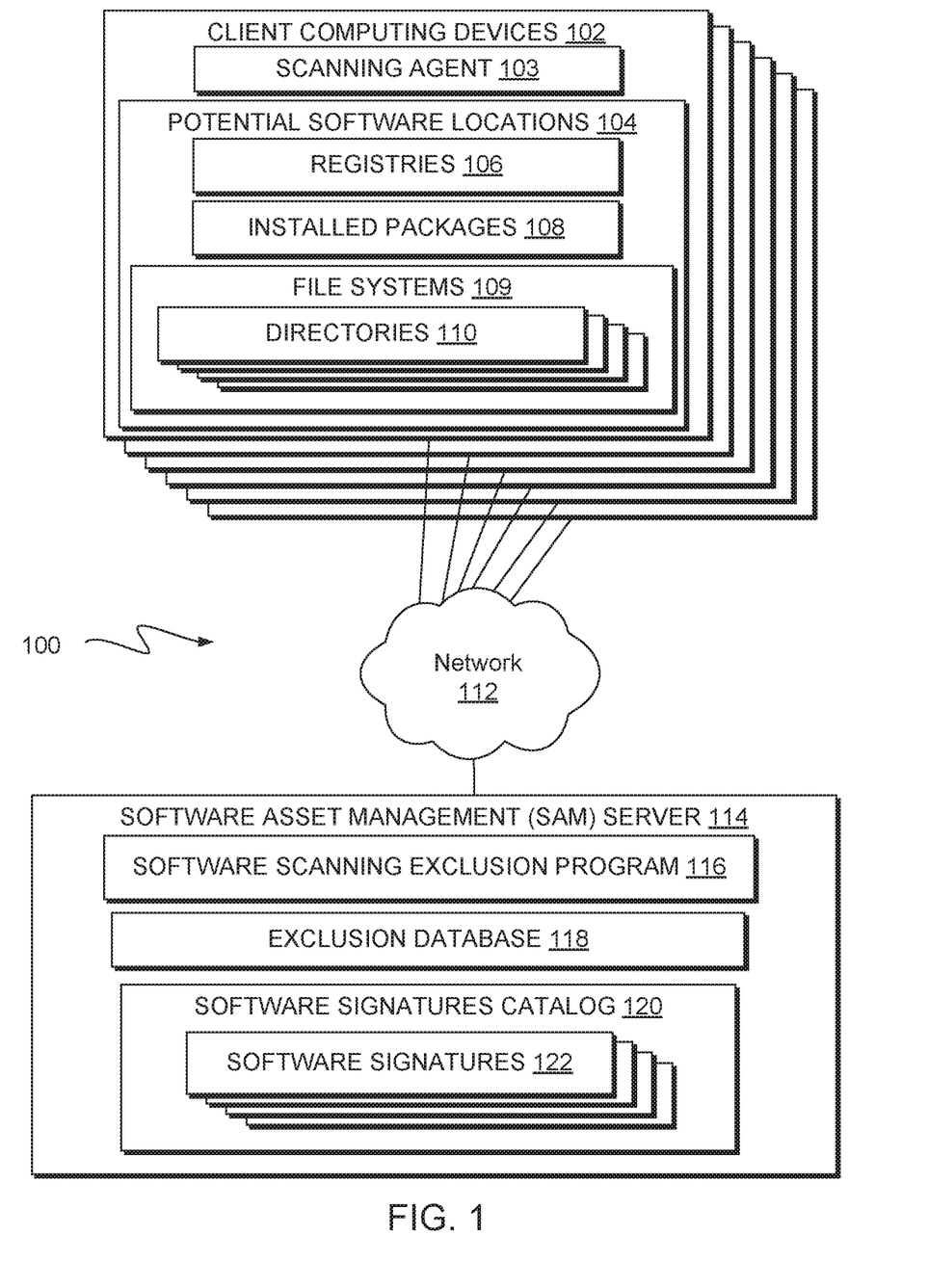
FIG. 1 is a functional block diagram illustrating a software discovery environment, in accordance with an exemplary embodiment of the present invention.

FIG. 1 is a functional block diagram illustrating a software discovery environment, generally designated 100, in accordance with one embodiment of the present invention. Software discovery environment 100 includes client computing devices 102 and software asset management (SAM) server 114 connected over network 112. Client computing devices 102 include potential software locations 104, which includes registries 106, installed packages 108, and file systems 109. File systems 109 includes directories 110. SAM server 114 includes software scanning exclusion program 116, exclusion database 118, and software signatures catalog 120. Software signatures catalog 120 includes software signatures 122.

In various embodiments of the present invention, client computing devices 102 and SAM server 114 are computing devices that can be standalone devices, servers, laptop computers, tablet computers, netbook computers, personal computers (PCs), or desktop computers. In another embodiment, client computing devices 102 and SAM server 114 represent a computing system utilizing clustered computers and components to act as a single pool of seamless resources. In general, SAM server 114 can be any computing device or combination of devices with access to potential software locations 104 (including registries 106, installed packages 108, and file systems 109 (including directories 110)), software scanning exclusion program 116, exclusion database 118, and software signatures catalog 120 (including software signatures 122) and is capable of executing software scanning exclusion program 116. SAM server 114 may include internal and external hardware components, as depicted and described in further detail with respect to FIG. 5.

In this exemplary embodiment, software scanning exclusion program 116, exclusion database 118, and software signatures catalog 120 (including software signatures 122) are stored on SAM server 114. However, in other embodiments, software scanning exclusion program 116, exclusion database 118, and software signatures catalog 120 (including software signatures 122) may be stored externally and accessed through a communication network, such as network 112. Network 112 can be, for example, a local area network (LAN), a wide area network (WAN) such as the Internet, or a combination of the two, and may include wired, wireless, fiber optic or any other connection known in the art. In general, network 112 can be any combination of connections and protocols that will support communications between SAM server 114, client computing devices 102, and software and data used to practice embodiments of the present invention, e.g., potential software locations 104 (including registries 106, installed packages 108, and file systems 109 (including directories 110)), software scanning exclusion program 116, exclusion database 118, and software signatures catalog 120 (including software signatures 122), in accordance with a desired embodiment of the present invention.

In exemplary embodiments, potential software locations 104 are, in general, memory and data storage locations in client computing devices 102 that potentially contain software artifacts and identifiers. In some scenarios and embodiments, one or both of software artifacts and identifiers of potential software locations 104 include a match to one or more software signatures included in software signatures 122 of software signatures catalog 120. Potential software locations 104 include for example, but are not limited to, registries (e.g., registries 106), installed software packages (e.g., installed packages 108), file systems with directories (e.g., file systems 109, directories 110), included in client computing devices 102.

In exemplary embodiments, software scanning exclusion program 116 monitors the scanning of potential software locations 104 during a search for software matches to one or more software signatures included in software signatures catalog 120. In various scenarios and embodiments as well as through various mechanisms, software scanning exclusion program 116 decreases the amount of memory that needs to be scanned in potential software locations 104 by generating exclusion lists of memory locations that do not require scanning for software.

In exemplary embodiments, software scanning exclusion program 116 also monitors one or more generic scans of at least portions of potential software locations 104 in order to determine directories that include software. Software scanning exclusion program 116 then creates, through a filtering mechanism, a subset list of memory locations within potential software locations 104 that need not be scanned during software discovery because the said subset list of memory and data storage locations do not contain discoverable software.

In exemplary embodiments, exclusion database 118 contains data identifying one or both of memory and data storage locations within potential software locations 104 that do not require scanning for software discovery. In various embodiments, exclusion database 118 contains such data that is specific for a given software signature within software signatures 122. In other words, exclusion database 118 has, for the given software signature within software signatures 122, information that identifies memory and data storage locations that do not require scanning for software matching the given software signature. In various embodiments, exclusion database 118 contains data that is not specific for a given software signature within software signatures 122. In these embodiments, exclusion database 118 contains data identifying the locations within potential software locations 104 that do not contain a threshold level of software hence do not require scanning during software discovery.

In exemplary embodiments, software signatures catalog 120 includes software signatures 122, each of which provide "fingerprint" data that allow software discovery scans to identify a specific version, edition, and release level of software on client computing devices 102. In exemplary embodiments, one or more software signatures within software signatures 122 also contain data that describes memory and data storage locations within potential software locations 104 that need not be scanned because no matching software will be found in those memory and data storage locations.

Figure 2:
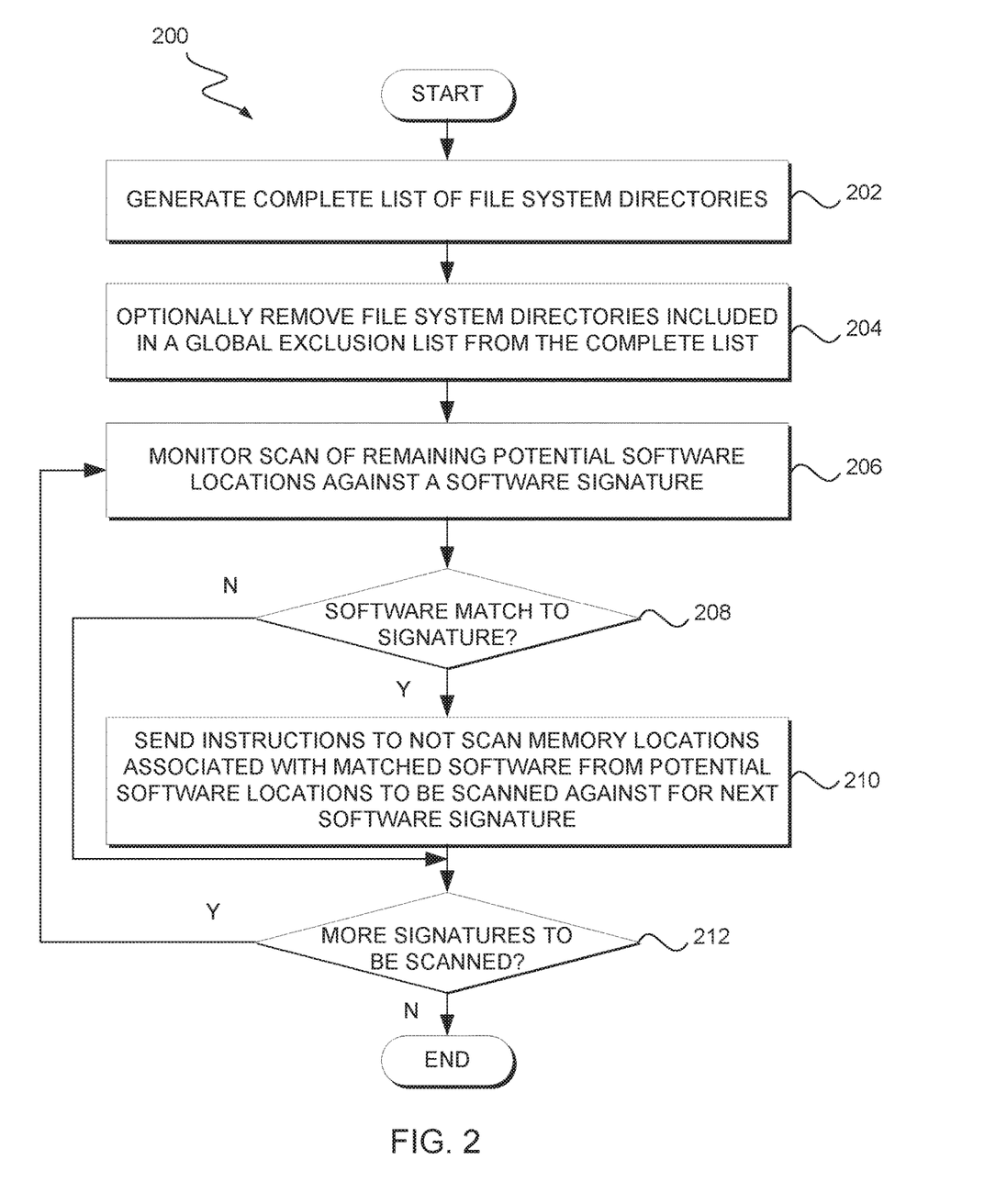
FIG. 2 illustrates operational processes for monitoring the scanning of client computing devices to discover software using a software scanning exclusion program within the environment of FIG. 1, in accordance with an exemplary embodiment of the present invention.

FIG. 2 illustrates operational processes 200 for monitoring the scanning of client computing devices 102 to discover software using software scanning exclusion program 116 within the environment of FIG. 1, in accordance with an exemplary embodiment of the present invention.

In step 202, software scanning exclusion program 116 (hereafter "program 116") generates a complete list of directories 110 within file systems 109.

In step 204, program 116 optionally removes one or more file system directories that are included in a global exclusion list of directories within exclusion database 118 from the complete list of directories 110 generated in step 202. In various embodiments, the global exclusion list of directories includes a list of directories that are known not to have a threshold level of software. The list of directories known not to have the threshold level of software is created by program 116 via a process described in more detail in FIG. 4. In some embodiments, the global exclusion list of directories includes a list of directories created by one or both of: 1) a vendor that distributes the software that software signatures 122 are used to discover and 2) an administrator of client computing devices 102.

In step 206, program 116 monitors a scan of the remaining potential software locations within potential software locations 104 against a software signature within software signatures catalog 120. The monitoring process includes identifying memory and data storage locations, within potential software locations 104, where software matching the software signature is found. The memory and data storage locations that potentially include matching software include, but are not limited to, registries 106, installed packages 108, and file systems 109 including directories 110.

In decision step 208, program 116 determines whether software is found that matches the software signature. If the answer is no (i.e. "N" of decision step 208, as shown in FIG. 2), then that indicates that the specific version, edition, and release level of software that matched the software signature was not found during the scan and scanning agent 103 returned an answer of "false." In general, an answer of "false", as used herein, indicates that software matching a software signature was not found during the scan. In this case, program 116 continues to decision step 212. If the answer is yes (i.e. "Y" of decision step 208, as shown in FIG. 2), then that indicates that the specific version, edition, and release level of software that matched the software signature was found during the scan. As such, in this embodiment, scanning agent 103 returned an answer of "true." In this case, program 116 continues to step 210.

In step 210, program 116 sends instructions to not scan memory and data storage locations associated with the software signature-matched software from potential software locations 104. In general, future software discovery scans leverage this information to reduce the use of computer resources when scanning memory and data storage locations. Thus, as an increasing amount of software is matched to software signatures 122, less and less memory and data storage locations in potential software locations 104 are scanned by scanning agent 103 in client computing devices 102. The net result is a decrease in the amount of computing resources consumed as scanning agent 103 progresses through software signatures 122.

In decision step 212, program 116 determines whether there are more signatures to be scanned by scanning agent 103. If the answer is yes (i.e. "Y" of decision step 212, as shown in FIG. 2), then program 116 goes to step 206 to monitor further scans of remaining potential software locations 104. If the answer is no (i.e. "N" of decision step 212, as shown in FIG. 2), then program 116 stops execution of agent scan monitoring.

In various embodiments, one or more software signatures in software signatures catalog 120 contain exclusion definitions. In general, an exclusion definition in a software signature provides a list of files and folders that need not be scanned if software matches the software signature. In various embodiments, exclusion definitions within the one or more software signatures are created by analyzing data that is stored by program 116 in exclusion database 118.

In some embodiments, the data in exclusion database 118 that leads to the creation of the exclusion definitions for the one or more software signatures is the result, at least in part, of previous software discovery scans using FIG. 2 operational processes. In some such embodiments, program 116 utilizes machine learning algorithms to determine, based, at least in part, on a statistically significant number of prior scans, which memory locations in client computing devices 102 are typically excluded when a match to a given software signature occurs. In general, a statistically significant number of prior scans is a number of prior scans equal to or above a threshold that is configured to indicate whether a match to a given software signature indicates that exclusion is warranted. Based, at least in part, on that determination, program 116 then generates an exclusion definition for that given software signature and adds it to exclusion database 118.

In some embodiments, exclusion definitions are, at least in part, created by software vendors that provide the software signatures based, for example, on a knowledge of files and folders that are created during the installation of software that matches a given software signature. In other words, the presence of software matching the given software signature indicates that certain folders and files were created in potential software locations 104 during the software installation process. In some such embodiments, this knowledge is leveraged by vendors to create exclusion definitions that tell scanning agent 103 on client computing device 102 not to scan those certain folders and files in subsequent scans using other software signatures. In general, scanning agent 103 does not scan those folders and files because it has been determined that they only contain software corresponding to an already discovered software application.

Figure 3:
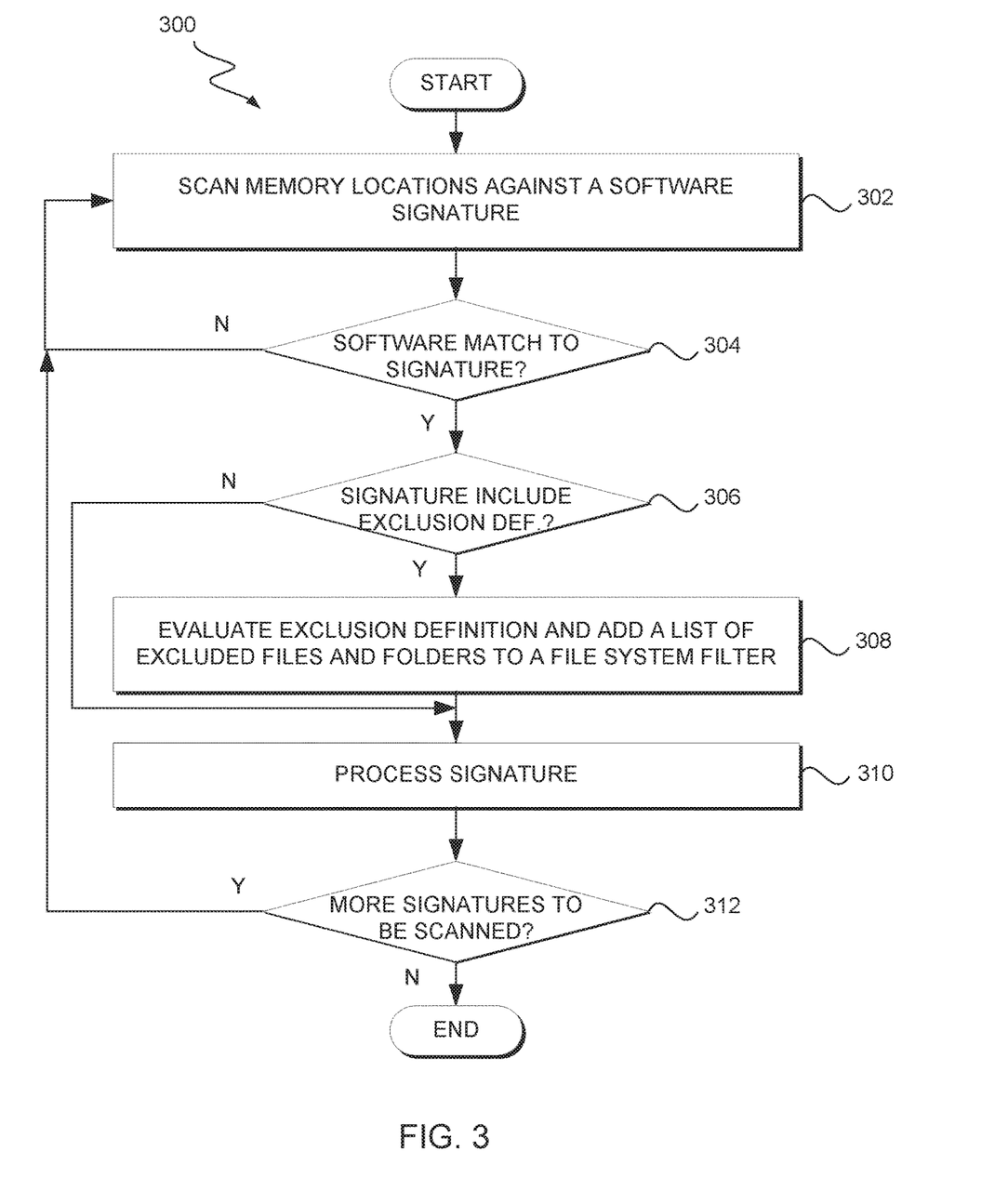
FIG. 3 illustrates operational processes for scanning client computing devices to discover software using software signatures with exclusion definitions within the environment of FIG. 1, in accordance with an exemplary embodiment of the present invention.

FIG. 3 illustrates operational processes 300 for scanning client computing devices 102 to discover software using software signature with exclusion definitions, within the environment of FIG. 1, in accordance with an exemplary embodiment of the present invention.

In step 302, scanning agent 103 scans memory and data storage locations within potential software locations 104 to find installed or running software matching a software signature in software signatures catalog 120. The memory and data storage locations contain, for example, file system objects, registries, names of running projects, etc.

In decision step 304, scanning agent 103 determines whether there is a software match to the software signature. If the answer is no (i.e. "N" of decision step 304, as shown in FIG. 3), then scanning agent 103 returns to step 302 to scan remaining potential software locations 104. If the answer is yes (i.e. "Y" of decision step 304, as shown in FIG. 3), then scanning agent 103 proceeds to decision step 306.

In decision step 306, scanning agent 103 determines whether the software signature includes an exclusion definition (denoted as "EXCLUSION DEF." in FIG. 3). If the answer is no (i.e. "N" of decision step 306, as shown in FIG. 3), then scanning agent 103 proceeds to step 310 to process the signature. If the answer is yes (i.e. "Y" of decision step 306, as shown in FIG. 3), then scanning agent 103 proceeds to step 308.

In step 308, scanning agent 103 evaluates the exclusion definition and adds a resulting list of excluded files and folders to file system filters within client computing devices 102. In various embodiments, evaluation of the exclusion definition includes a process where relative variables in the exclusion definition are replaced with values obtained from client computing devices 102 such as environmental variables, registry values, file contents, file locations, etc. When the resulting excluded files and folders are added to client computing devices 102 file system filters, client computing devices 102 does not scan the excluded files and folders in any subsequent scans of other software signatures.

In step 310, scanning agent 103 processes the software signature by adding the discovered software to a stored list of discovered software matching other software signatures within software signatures catalog 120.

In decision step 312, scanning agent 103 determines whether there are more software signatures to be scanned. If the answer is yes (i.e. "Y" of decision step 312, as shown in FIG. 3), then scanning agent 103 returns to step 302 to continue scanning memory and data storage locations within remaining potential software locations 104 against the next software signature. If the answer is no (i.e. "N" of decision step 312, as shown in FIG. 3), then scanning agent 103 stops execution of the scanning process.

Figure 4:
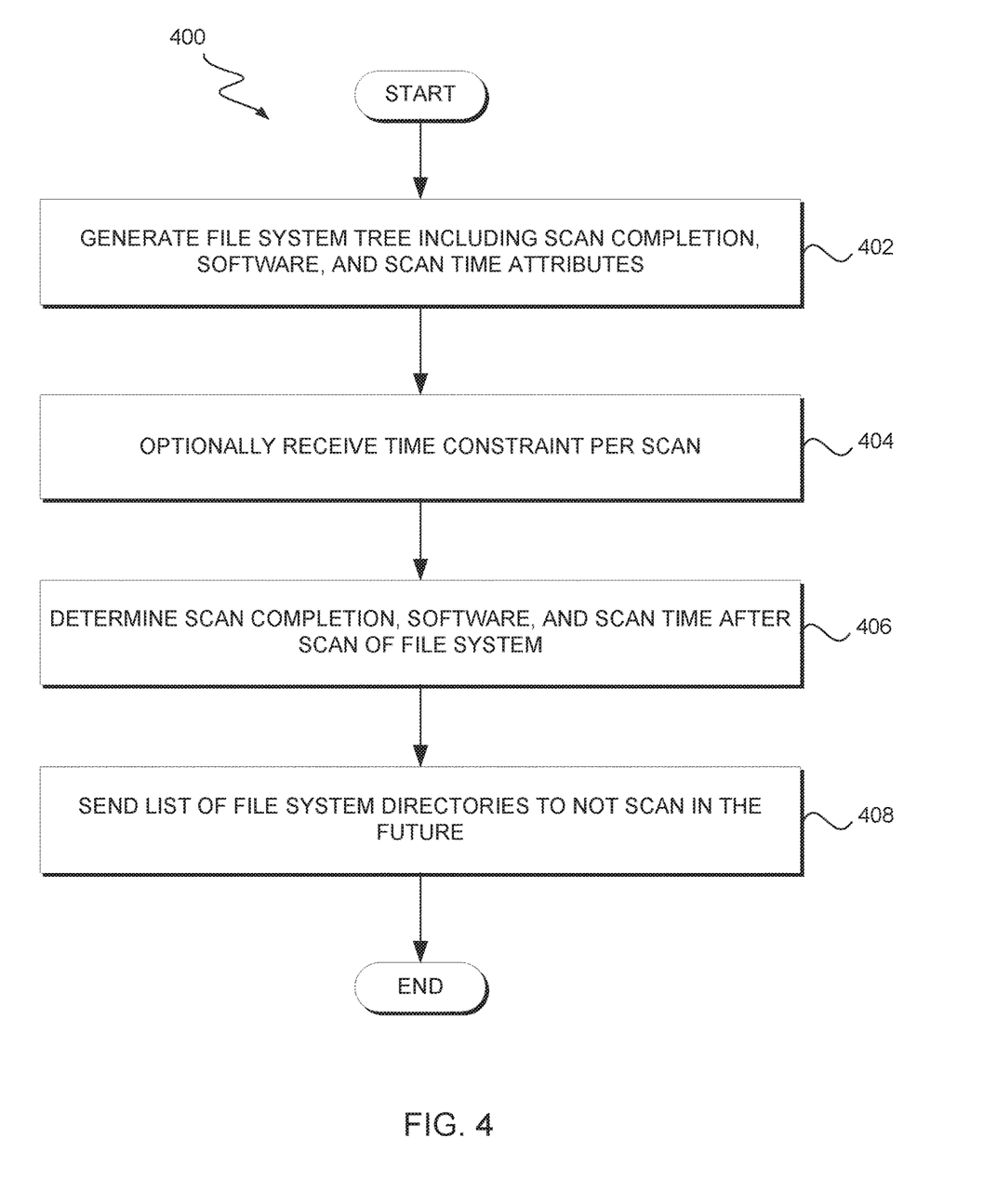
FIG. 4 illustrates operational processes for monitoring the scanning of client computing devices to create a global exclusion list using the software scanning exclusion program within the environment of FIG. 1, in accordance with an exemplary embodiment of the present invention.

FIG. 4 illustrates operational processes 400 for monitoring the scanning of client computing devices 102 to create a global exclusion list using software scanning exclusion program 116 within the environment of FIG. 1, in accordance with an exemplary embodiment of the present invention.

In step 402, program 116 generates a file system tree representing client computing devices 102 file systems. In various embodiments, the file system tree will include directories that include one or more of the following attributes: a scan completion attribute, a software presence attribute, and a scan time attribute. In exemplary embodiments, the file system tree is hierarchical in nature and shows file system directories and subdirectories. In one embodiment, the file system tree is output by program 116 as a graph wherein nodes in the graph represent directories and edges between the nodes represent relationships between the directories (e.g., a directory with subdirectories will appear as a node connected to other nodes that represent the subdirectories). In another embodiment, the file system tree is output by program 116 as a table that shows the file system directories hierarchy in tabular form.

As stated above, the file system tree directories includes one or more of at least three attributes. In one embodiment, the scan completion attribute indicates whether or not the directory has been completely scanned (e.g., yes or no). In another embodiment, the scan completion attribute indicates how much of the directory has been scanned. For example, the scan attribute indicates the percentage of the directory that has been scanned. In a second example, the scan attribute indicates the number of memory units (e.g., kilobytes, megabytes, etc.) that have been scanned, the number of memory units left to be scanned, the total number of memory units for all files in the directory, etc.

In one embodiment, the software presence attribute indicates whether or not any software has been found in a given directory (e.g., yes or no). In another embodiment, the software presence attribute indicates how much software is present in a directory. For example, the software presence attribute indicates how many software files are in a directory. In a second example, the software presence attribute indicates what percentage of memory in a directory is attributable to software. In various embodiments, the scan time attribute indicates the amount of time it has taken for both a partially completed scan of a directory and a full scan of the directory.

In various embodiments, scanning the entire file systems of client computing devices 102 requires a total amount of scan time, above a threshold, wherein client computing devices 102 will exhibit less than peak performance. Thus, in these embodiments program 116 includes a default timeout after a certain amount of scan time. In other words, the entire file systems 109 are not scanned in one session, but are scanned in portions, wherein a subsequent scan starts at the same place in file systems 109 where a prior scan ended. In some embodiments, a subsequent scan session begins at a location in one or both of the memory and data storage where an immediately prior scan session ended. In step 404, program 116 optionally receives a time constraint per scan session. In one embodiment, the time constraint is the default timeout. In another embodiment, a different timeout is allowed to be set by users or administrators of client computing devices 102 for a given scan session.

In step 406, program 116 determines values for the scan completion attribute, software presence attribute, and scan time attribute after each piecemeal scan of file systems 109. The values output by program 116 will depend on the embodiments discussed for step 402. For example, if the scan completion attribute is just set to determine whether or not a scan is completed for a given directory, then the value is "null" or "no" if the scan of the given directory is not complete, and conversely is "yes" if the given directory has been completely scanned. In one embodiment, "null" means that scanning of a directory has not been started, "no" means that scanning has been started but is incomplete, and "yes" means the directory has been completely scanned for the presence of software. The same logic applies to a software presence attribute that is just set to determine whether or not software is present in a directory. After a portioned scan, in which software is first detected in a directory, the value of the software presence attribute for that directory will change from "null" or "no" to "yes." Those skilled in the art will understand that many different scenarios are possible given the various embodiments discussed herein for this step as well as step 402 above.

In step 408, program 116 generates a global exclusion list for software discovery scans of client computing devices 102 and sends the global exclusion list to a system filter so that the file system directories on the exclusion list are not scanned during software discovery. Whether or not a directory is included in the exclusion list is determined by a threshold. In one embodiment, program 116 would only place directories in the exclusion list if the directories contained no software (i.e., the threshold is true or false). In this embodiment, scanning of file systems 109 is reduces computer resource consumption because a given directory does not, in many scenarios, require additional scanning once software is detected. However, in some scenarios, such a threshold can result in the production of a smaller exclusion list, which will, in turn, may inhibit reduction in computer resource consumption during software discovery scans of client computing devices 102 using software signatures 122. Thus, in some embodiments and scenarios, various thresholds are utilized such that a threshold percentage of software is set. in some such embodiments, if a lower percentage than the threshold percentage is in a directory, then that directory is added to the exclusion list by program 116.

Figure 5:
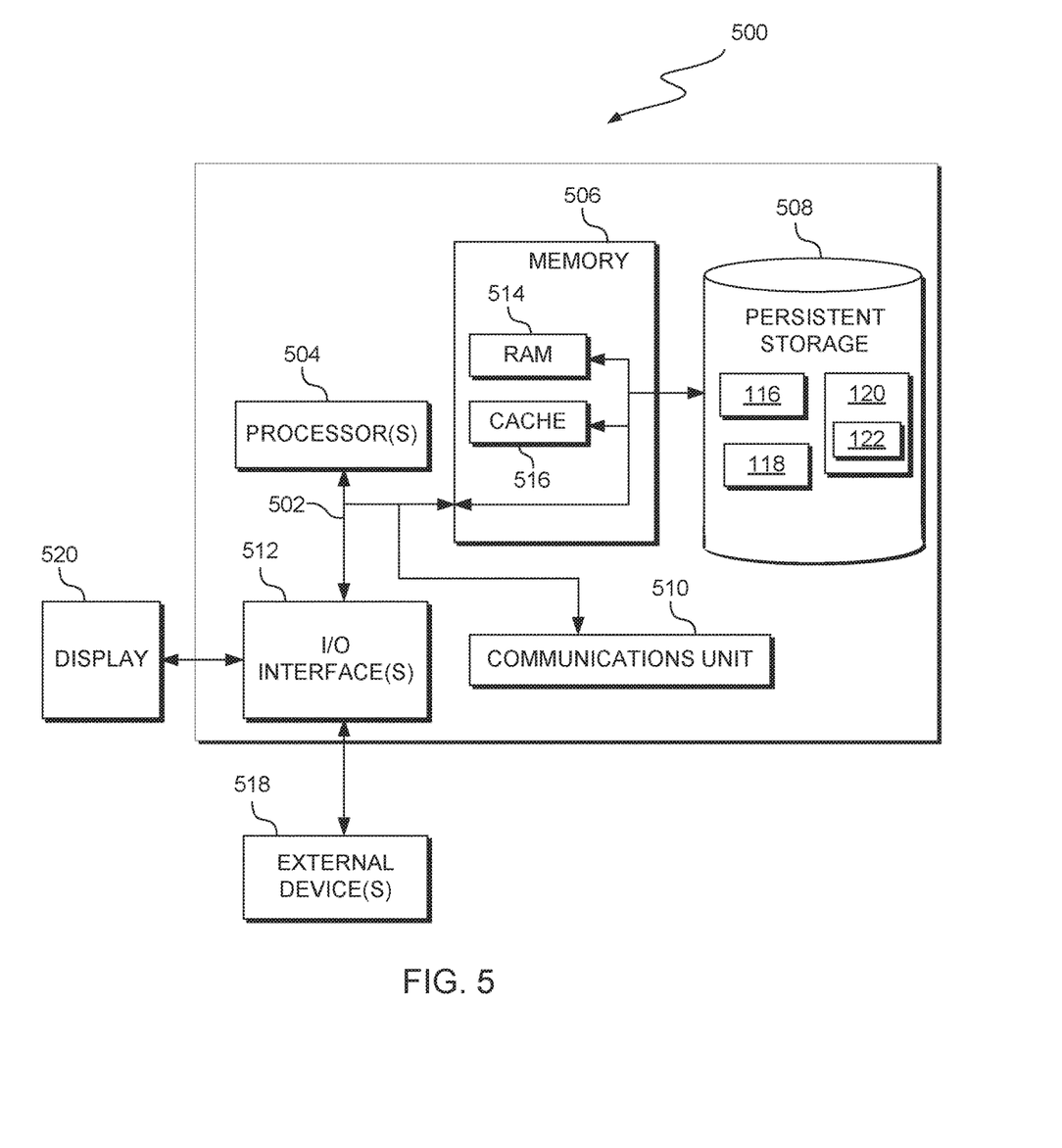
FIG. 5 depicts a block diagram of components of a computing device executing the software scanning exclusion program, in accordance with an exemplary embodiment of the present invention.

FIG. 5 depicts a block diagram, 500, of components of SAM server 114, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

SAM server 114 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Software scanning exclusion program 116, exclusion database 118, and software signatures catalog (including software signatures 122) are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 112. In these examples, communications unit 510 includes one or more network interface cards. Communications unit 510 may provide communications through the use of either or both physical and wireless communications links. Software scanning exclusion program 116, exclusion database 118, and software signatures catalog (including software signatures 122) may be downloaded to persistent storage 508 through communications unit 510.

I/O interface(s) 512 allows for input and output of data with other devices that may be connected to SAM server 114. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., software scanning exclusion program 116, exclusion database 118, and software signatures catalog (including software signatures 122), can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method comprising:
installing a first software application to a client computing device, the first software application including a first software signature for which a set of exclusion definitions are pre-defined prior to installation of the first software application;
assigning a set of values respectively corresponding to a set of variables in the set of exclusion definitions while installing the first software application to generate a list of file locations included in an exclusion database;
identifying, within a signature catalog, the first software signature of the first software application;
identifying, based on a first software discovery scan, a first software artifact indicating the presence of the first software application according to the first software signature, the software artifact being located in a file storage location;
responsive to identifying the first software artifact, associating in the exclusion database the first software application with the list of file locations including the file storage location;
identifying, within the signature catalog, a second software signature of a second software application;
modifying a system filter for a second software discovery scan to search for the second software signature while excluding from the second software discovery scan file locations associated with the first software application according to the exclusion database including the list of file locations; and
responsive to identifying a second software artifact indicating the presence of the second software application according to the second software signature, the second software artifact being located in a second file storage location, updating the exclusion database, with respect to the second software application, to include a list of other file locations including the second file storage location such that the second file storage location will not be scanned for data associated with the first software application.

2. The method of claim 1, further comprising:
monitoring installation of the first software application;
determining the list of file locations created during the installation; and
recording the list of file locations to the exclusion database as being associated with the first software signature.

3. The method of claim 2, wherein the list of file locations further includes a file location reserved for the first software application as a directory.

4. The method of claim 2, wherein the list of file locations further includes a file location reserved for the first software application to store configuration files.

5. The method of claim 1, further comprising:
modifying the system filter for subsequent software discovery scans for other software applications to exclude the other file locations in the list of other file locations; and
establishing a next software discovery scan that excludes the other file locations from being scanned.

6. A computer program product comprising a computer readable storage medium having stored thereon:
program instructions programmed to install a first software application to a client computing device, the first software application including a first software signature for which a set of exclusion definitions are pre-defined prior to installation of the first software application;
program instructions programmed to assign a set of values respectively corresponding to a set of variables in the set of exclusion definitions while installing the first software application to generate a list of file locations included in an exclusion database;
program instructions programmed to identify, within a signature catalog, the first software signature of the first software application;
program instructions programmed to identify, based on a first software discovery scan, a software artifact indicating the presence of the first software application according to the first software signature, the software artifact being located in a file storage location;
program instructions programmed to, responsive to identifying the software artifact, associate in the exclusion database the first software application with the list of file locations including the file storage location;
program instructions programmed to identify, within the signature catalog, a second software signature of a second software application;
program instructions programmed to modify a system filter for a second software discovery scan to search for the second software signature while excluding from the second software discovery scan file locations associated with the first software application according to the exclusion database including the list of file locations; and
program instructions programmed to, responsive to identifying a second software artifact indicating the presence of the second software application according to the second software signature, the second software artifact being located in a second file storage location, update the exclusion database, with respect to the second software application, to include a list of other file locations including the second file storage location such that the second file storage location will not be scanned for data associated with the first software application.

7. The computer program product of claim 6 comprising the computer readable storage medium having further stored thereon:
program instructions programmed to monitor installation of the first software application;
program instructions programmed to determine the list of file locations created during the installation; and
program instructions programmed to record the list of file locations to the exclusion database as being associated with the first software signature.

8. The computer program product of claim 6 wherein the list of file locations further includes a file location reserved for the first software application as a directory.

9. The computer program product of claim 6 wherein the list of file locations further includes a file location reserved for the first software application to store configuration files.

10. The computer program product of claim 6 comprising the computer readable storage medium having further stored thereon:
modifying the system filter for subsequent software discovery scans for other software applications to exclude the other file locations in the list of other file locations; and
establishing a next software discovery scan that excludes the other file locations from being scanned.

11. A computer system comprising:
a processor set; and
a computer readable storage medium;
wherein:
the processor set is structured, located, connected, or programmed to run program instructions stored on the computer readable storage medium; and
the program instructions which, when executed by the processor set, cause the processor set to perform software discovery using exclusions by:
installing a first software application to a client computing device, the first software application including a first software signature for which a set of exclusion definitions are pre-defined prior to installation of the first software application;
assigning a set of values respectively corresponding to a set of variables in the set of exclusion definitions while installing the first software application to generate a list of file locations included in an exclusion database;
identifying, within a signature catalog, the first software signature of the first software application;
identifying, based on a first software discovery scan, a first software artifact indicating the presence of the first software application according to the first software signature, the software artifact being located in a file storage location;
responsive to identifying the first software artifact, associating in file exclusion database the first software application with the list of file locations including the file storage location;
identifying, within the signature catalog, a second software signature of a second software application;
modifying a system filter for a second software discovery scan to search for the second software signature while excluding from the second software discovery scan file locations associated with the first software application according to the exclusion database including the list of file locations; and
responsive to identifying a second software artifact indicating the presence of the second software application according to the second software signature, the second software artifact being located in a second file storage location, updating the exclusion database, with respect to the second software application, to include a list of other file locations including the second file storage location such that the second file storage location will not be scanned for data associated with the first software application.

12. The computer system of claim 11 running program instructions further causing the processor set to perform software discovery using exclusions by:
monitoring installation of the first software application;
determining the list of file locations created during the installation; and recording the list of file locations to the exclusion database as being associated with the first software signature.

13. The computer system of claim 11 wherein the list of file locations further includes a file location reserved for the first software application as a directory.

14. The computer system of claim 11 wherein the list of file locations further includes a file location reserved for the first software application to store configuration files.

15. The computer system of claim 11 running program instructions further causing the processor set to perform software discovery using exclusions by:
  modifying the system filter for subsequent software discovery scans for other software applications to exclude the other file locations in the list of other file locations; and
  establishing a next software discovery scan that excludes the other file locations from being scanned.

\* \* \* \* \*